(12) United States Patent
Kodera et al.

(10) Patent No.: US 10,266,166 B2
(45) Date of Patent: Apr. 23, 2019

(54) VEHICLE CONTROL SYSTEM (71) Applicant: TOYOTA JIDOSHA KABUSHIKI KAISHA, Toyota-shi, Aichi-ken (JP)

(72) Inventors: Hiroaki Kodera, Susono (JP); Takahito Endo, Shizuoka-ken (JP); Kensei Hata, Shizuoka-ken (JP); Naoki Harayama, Shizuoka-ken (JP); Katsuya Iwazaki, Susono (JP); Yushi Seki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/042,554

(22) Filed: Jul. 23, 2018

(65) Prior Publication Data
US 2019/0031172 A1    Jan. 31, 2019

(30) Foreign Application Priority Data
Jul. 25, 2017    (JP) .................................. 2017-143769

(51) Int. Cl.
*B60W 10/06*    (2006.01)
*B60W 10/20*    (2006.01)
(Continued)

(52) U.S. Cl.
CPC ............ *B60W 10/06* (2013.01); *B60W 10/18* (2013.01); *B60W 10/20* (2013.01);
(Continued)

(58) Field of Classification Search
CPC  B60K 6/54; B60K 6/485; B60L 11/14; B60L 15/20; B60T 7/12; B60W 10/02; B60W 10/06; B60W 10/08; B60W 10/18; B60W 20/00; B60W 30/00; B60W 30/0953; B60W 30/0956; B60W 30/18136;
(Continued)

(56) References Cited

U.S. PATENT DOCUMENTS

2001/0039230 A1*  11/2001  Severinsky ............ B60H 1/004
                                                              477/3
2009/0312929 A1*  12/2009  Doebele ................ B60W 10/02
                                                              701/66
(Continued)

FOREIGN PATENT DOCUMENTS

JP          S4746970 B     11/1972
JP          H104331402 A   11/1992
(Continued)

*Primary Examiner* — Rachid Bendidi
(74) *Attorney, Agent, or Firm* — Hunton Andrews Kurth LLP (57) ABSTRACT

A vehicle control system to prevent a shortage of a braking force when temporarily stopping a vehicle during autonomous operation. The vehicle control system comprises: a prime mover; a drive wheel; a brake device that applies a brake torque to the drive wheel; an interrupting device that selectively allows a torque transmission the prime mover and the drive wheel; and a controller that operates a vehicle autonomously. The controller is configured to: detect a stop point; stop the vehicle temporarily at the stop point; disengage the interrupting device; and engages the interrupting device after confirming safety condition.

18 Claims, 8 Drawing Sheets

(51) Int. Cl.
  *F01N 3/20* (2006.01)
  *B60W 30/18* (2012.01)
  *B60W 30/095* (2012.01)
  *B60W 10/18* (2012.01)
  *G05D 1/00* (2006.01)

(52) U.S. Cl.
  CPC .... *B60W 30/0953* (2013.01); *B60W 30/0956* (2013.01); *B60W 30/18136* (2013.01); *B60W 30/18154* (2013.01); *F01N 3/2006* (2013.01); *G05D 1/0088* (2013.01); *B60W 2510/068* (2013.01); *B60W 2550/408* (2013.01); *G05D 2201/0213* (2013.01)

(58) Field of Classification Search
  CPC ....... B60W 30/18154; B60W 2550/408; F01N 3/20; F01N 3/2006; F16D 48/02; G05D 1/0088; G05D 2201/0213
  See application file for complete search history.

(56) References Cited

U.S. PATENT DOCUMENTS

| | | | |
|---|---|---|---|
| 2016/0363109 A1* | 12/2016 | Akita | F02B 63/04 |
| 2017/0120921 A1* | 5/2017 | Mair | B60W 10/02 |
| 2017/0248226 A1* | 8/2017 | Muto | F16H 61/12 |

FOREIGN PATENT DOCUMENTS

| | | |
|---|---|---|
| JP | H09039613 A | 2/1997 |
| JP | 2003315066 A | 11/2003 |
| JP | 2004036736 A | 2/2004 |
| JP | 2006096157 A | 4/2006 |
| JP | 2006350570 A | 12/2006 |
| JP | 2007118946 A | 5/2007 |
| JP | 2010026618 A | 2/2010 |
| JP | 2010048198 A | 3/2010 |
| JP | 2012144184 A | 8/2012 |
| JP | 2013159117 A | 8/2013 |
| JP | 2013177126 A | 9/2013 |
| JP | 2017124807 A | 7/2017 |

* cited by examiner

VEHICLE CONTROL SYSTEM

CROSS REFERENCE TO RELATED APPLICATIONS

The present invention claims the benefit of priority to Japanese Patent Application No. 2017-143769 filed on Jul. 25, 2017 with the Japanese Patent Office, the entire contents of which are incorporated herein by reference in its entirety.

BACKGROUND

Field of the Invention

Embodiments of the present application relate to the art of a vehicle control system configured to operate a vehicle autonomously without manipulating an accelerator, a brake, and a steering.

Discussion of the Related Art

JP-A-2010-48198 discloses an operation support device configured to stop a vehicle at a stop sign of an intersection, and to allow the vehicle to run after a driver confirm the safely condition. Specifically, the operation support device controls a braking force to automatically stop the vehicle at a detected stop position, and cancels an operation of an accelerator after stopping the vehicle. That is, according to the teachings of JP-A-2010-48198, a throttle valve of an engine is closed irrespective of a position of an accelerator pedal after stopping the vehicle. Then, the operation support device gradually reduces the braking force to launch the vehicle, and enables the throttle valve to be operated after detecting a fact that the driver has confirmed the safely condition by an on-board camera.

According to the teachings of JP-A-2010-48198, the operation support device keeps the vehicle stopping at a stop line or the like by closing the throttle valve while increasing the braking force to a predetermined magnitude. However, in the vehicle having the engine, it is necessary to open the throttle valve e.g., when auxiliaries are activated or when the vehicle travels on an uphill grade. In those cases, according to the teachings of JP-A-2010-48198, a condition to close the throttle valve to stop the vehicle will not be satisfied. According to the teachings of JP-A-2010-48198, therefore, the braking force may not be established sufficiently if a brake device is aged or, depending on a road surface condition.

SUMMARY

Aspects of embodiments of the present disclosure have been conceived noting the foregoing technical problems, and it is therefore an object of the present disclosure is to provide a vehicle control system configured to prevent a shortage of a braking force when temporarily stopping a vehicle during autonomous operation.

According to one aspect of the present disclosure, there is provided a vehicle control system comprising: a prime mover; a drive wheel to which a torque is delivered from the prime mover to generate a driving force; a brake device that applies a brake torque to at least any one of wheels including the drive wheel; an interrupting device that is disposed on a torque transmission route between the prime mover and the drive wheel to allow torque transmission through the torque transmission route when engaged, and to interrupt torque transmission through the torque transmission route when disengaged; and a controller that operates a vehicle autonomously without requiring a driver to launch, stop, and turn the vehicle manually by controlling at least the prime mover, the brake device, and the interrupting device. The controller is configured to: detect a stop point at which the vehicle is ordered to stop temporarily; execute a braking control to stop the vehicle at the stop point when the stop point is detected; disengage the interrupting device while stopping the vehicle temporarily; confirm a safety condition based on information about an external condition when launching the vehicle from the stop point, while keeping the vehicle to stop and keeping disengagement of the interrupting device; and engage the interrupting device after confirming the safety condition.

According to another aspect of the present disclosure, there is provided a vehicle control system, comprising: a prime mover; a drive wheel to which a torque is delivered from the prime mover to generate a driving force; a brake device that applies a brake torque to at least any one of wheels including the drive wheel; an interrupting device that is disposed on a torque transmission route between the prime mover and the drive wheel to allow torque transmission through the torque transmission route when engaged, and to interrupt torque transmission through the torque transmission route when disengaged; and a controller that operates a vehicle autonomously without requiring a driver to launch, stop, and turn the vehicle manually by controlling at least the prime mover, the brake device, and the interrupting device. The controller is configured to: detect a stop point at which the vehicle is ordered to stop temporarily; determine whether the vehicle can arrive at the stop point by coasting the vehicle while disengaging the interrupting device; disengage interrupting device before the vehicle arrives at the stop point while executing a braking control to stop the vehicle temporarily at the stop point, when the vehicle can arrive at the stop point by coasting the vehicle while disengaging the interrupting device; confirm a safety condition based on information about an external condition when launching the vehicle from the stop point, while keeping the vehicle to stop and keeping disengagement of the interrupting device; and engage the interrupting device after confirming the safety condition.

In a non-limiting embodiment, the controller may be further configured to determine whether the vehicle can arrive at the stop point by coasting the vehicle while disengaging the interrupting device, and disengage interrupting device before the vehicle arrives at the stop point when the vehicle can arrive at the stop point by coasting the vehicle while disengaging the interrupting device.

In a non-limiting embodiment, wherein the prime mover may include an engine, and the vehicle control system may further comprise a catalytic converter. The controller may be further configured to detect a temperature of the catalytic converter while stopping the vehicle temporarily at the stop point, and stop the engine when the temperature of the catalytic converter is higher than a first reference temperature.

In a non-limiting embodiment, the controller may be further configured to restart the engine while stopping the vehicle temporarily at the stop point, when the temperature of the catalytic converter is higher than a second reference temperature that is lower than the first reference temperature.

In a non-limiting embodiment, the prime mover may include an engine and a motor, and the vehicle control system further comprises a catalytic converter. The catalytic converter may be warmed by a heat generated by the motor.

The controller may be further configured to detect a temperature of the catalytic converter while stopping the vehicle temporarily at the stop point, and stop the engine and the motor when the temperature of the catalytic converter is higher than a first reference temperature.

In a non-limiting embodiment, the controller may be further configured to restart any one of the engine and the motor while stopping the vehicle temporarily at the stop point, when the temperature of the catalytic converter is higher than a second reference temperature that is lower than the first reference temperature.

In a non-limiting embodiment, the controller may be further configured to stop the vehicle at a width center of a road when stopping the vehicle at the stop point in a one-way road.

In a non-limiting embodiment, the controller may be further configured to determine whether other vehicle from other approach stops at an intersection, exchange information with the other vehicle for determining a priority order to enter the intersection, and determine the priority order to enter the intersection based on the exchanged information.

In a non-limiting embodiment, the information may include an arrival time at the intersection.

In a non-limiting embodiment, the controller may be further configured to determine whether other vehicle from other approach stops at an intersection, exchange information about a travelling direction with the other vehicle, and allow the vehicle to enter the intersection irrespective of entrance of the other vehicle when the travelling direction of the vehicle do not intersect with the travelling direction of the other vehicle.

Thus, according to the embodiment of the present disclosure, the vehicle control system stops the vehicle at the stop point when the stop point is detected during autonomous operation, and disengages the interrupting device to interrupt torque transmission between the prime mover and the drive wheel. Then, the vehicle control system engages the interrupting device to launch the vehicle after confirming the safety condition. According to the embodiment of the present disclosure, therefore, the prime mover may be stopped and activated according to need while the vehicle is stopped temporarily. In addition, torque of the prime mover will not be delivered to the drive wheel when the vehicle is stopped. For this reason, the braking force can be ensured sufficiently to increase the safety even if the brake device is aged, irrespective of a road surface condition. In addition, resistances applied to the prime mover can be reduced by disengaging the interrupting device while the vehicle is stopped temporarily. For this reason, it is unnecessary to drive the prime mover excessively and hence the fuel and the electricity can be saved.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
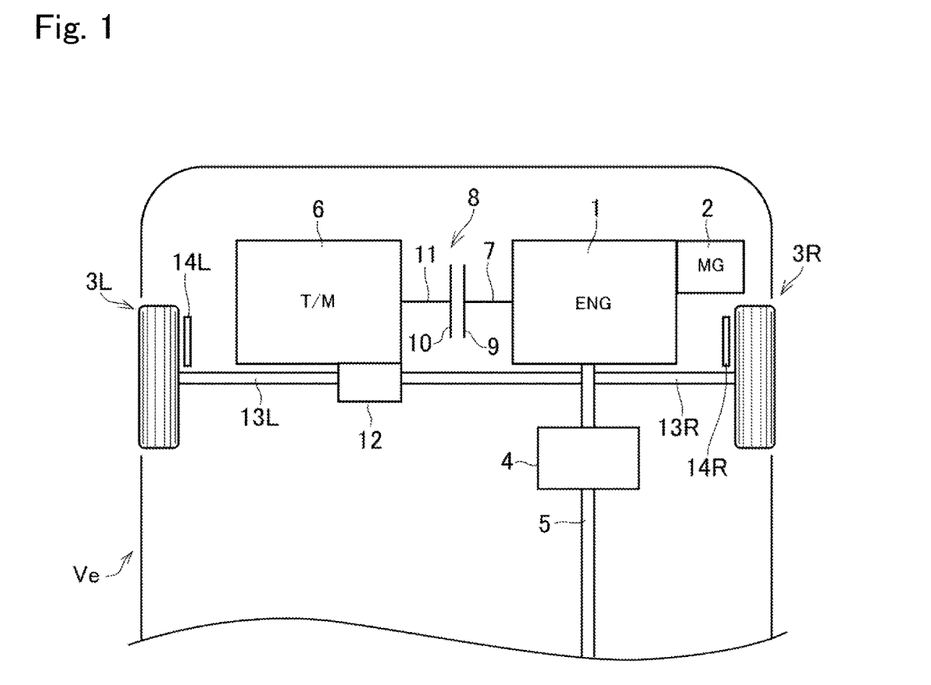
FIG. 1 is a schematic illustration showing one example of a vehicle to which the control system according to the present disclosure is applied.

Preferred embodiments of the present application will now be explained with reference to the accompanying drawings. Referring now to FIG. 1, there is schematically shown an example of a vehicle Ve as a hybrid vehicle to which the control system according to the present disclosure is applied. As shown in FIG. 1, a prime mover of the vehicle Ve includes an engine (referred to as "ENG" in FIG. 1) 1 and a motor (referred to as "MG" in FIG. 1) 2. The engine 1 and the motor 2 are arranged in a front section of the vehicle Ve, and output torques of the engine 1 and the motor 2 are delivered to front wheels 3R and 3L as drive wheels.

The engine 1 generates power by burning air/fuel mixture, and for example, a gasoline engine and a diesel engine may be used as the engine 1. In order to purify the exhaust gas emitted from the engine 1, a catalytic converter 4 is disposed on an exhaust pipe 5 extending backwardly from the engine 1. A purifying performance of the catalytic converter 4 is optimized at a predetermined temperature, and the catalytic converter 4 is warmed by the exhaust gas of the engine 1. Specifically, the catalytic converter 4 is warmed by reducing an air/fuel ratio of the mixture supplied to the engine 1. Instead, the catalytic converter 4 may also be warmed by transferring heat of a transmission (referred to as "T/M" in FIG. 1) 6 to the catalytic converter 4, or by feeding oil that has been warmed as a result of cooling the motor 2 and so on around the catalytic converter 4.

Figure 2:
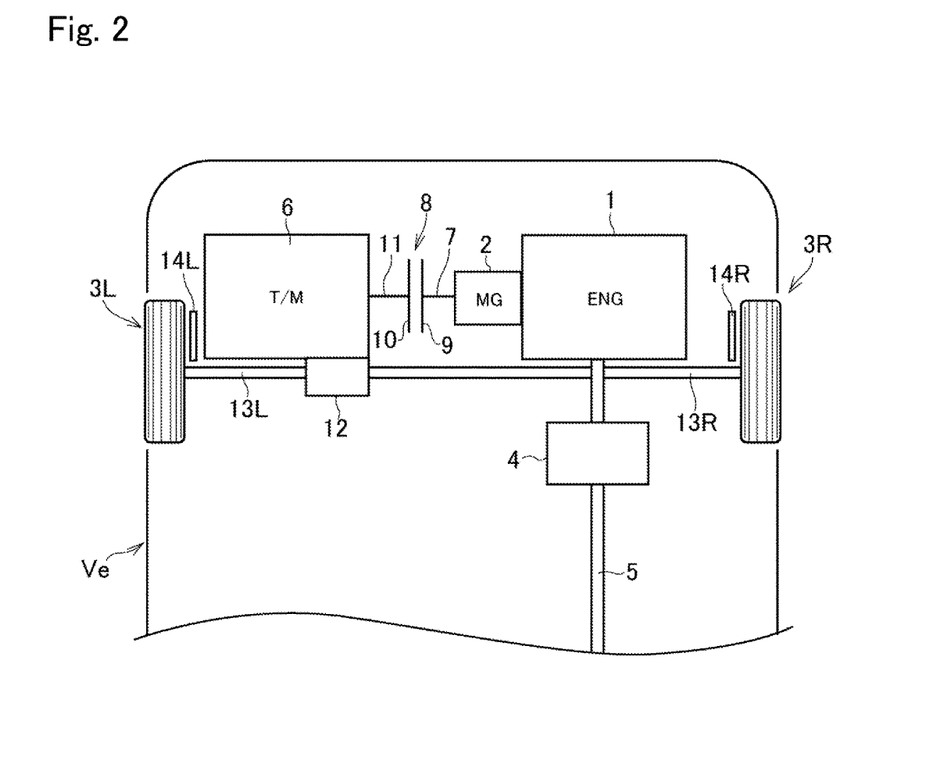
FIG. 2 is a schematic illustration showing another example of a the vehicle in which a position of a motor is altered.

An output shaft 7 of the engine 1 extends in the width direction of the vehicle Ve toward the left side, and the motor 2 is disposed on the right side of the engine 1. The output shaft 7 penetrates through the engine 1 to a right end of the engine 1 to be connected to the motor 2 so that an output torque of the motor 2 is applied to the output shaft 7. In the vehicle Ve, therefore, torque may be applied to the output shaft 7 only by the engine 1, by both of the engine 1 and the motor 2, or only by the motor 2. Alternatively, as illustrated in FIG. 2, the motor 2 may also be disposed on an output side (i.e., the left side) of the engine 1.

The motor 2 is a motor-generator that is adapted not only to generate a drive torque to propel the vehicle Ve, but also to establish a brake torque to stop or decelerate the vehicle Ve. Specifically, the motor 2 translates a kinetic energy into an electric energy when establishing the brake torque. For example, a permanent magnet type synchronous motor or an induction motor may be used as the motor 2, and the motor 2 is connected to a battery through and an inverter or a converter (neither of which are shown).

The output shaft 7 of the engine 1 is coupled to a clutch 8 serving as an interrupting device of the embodiment, and according to the embodiment, a friction clutch is adopted as the clutch 8. The clutch 8 comprises a drive plate 9, a driven plate 10, and an actuator (not shown). Specifically, the output shaft 7 of the engine 1 is coupled to the drive plate 9, and an input shaft 11 of the transmission 6 is coupled to the driven plate 10. Thus, the clutch 8 is disposed on a torque transmitting route from the engine 1 or the motor 2 to the front wheels 3R and 3L. The drive plate 9 and the driven plate 10 are brought into frictional contact to each other in accordance with an actuating amount of the actuator to transmit torque between the engine 1 or the motor 2 and the front wheels 3R and 3L, and the torque transmission between the engine 1 or the motor 2 to the front wheels 3R and 3L is interrupted by isolating the drive plate 9 and the driven plate 10 from each other by the actuator. Instead, a dog clutch that transmits torque by engaging dog teeth of rotary members may also be used as the clutch 8 instead of the friction clutch.

For example, a geared transmission and a continuously variable transmission may be used as the transmission 6, and a speed ratio of the transmission 6 is changed in accordance with a vehicle speed and a required drive force.

The transmission 6 is connected to the front wheels 3R and 3L through a differential gear unit 12 and driveshafts 13R and 13L. The right front wheel 3R is provided with a brake device 14R, and the left front wheel 3L is provided with a brake device 14R. Optionally, rear wheels (not shown may also be provided individually with the brake device.

An operating mode of the vehicle Ve may be selected from a manual mode in which the vehicle Ve is operated manually by a driver, and an autonomous mode in which the vehicle Ve is operated autonomously without operating an accelerator, the brake devices, and a steering wheel manually.

Figure 3:
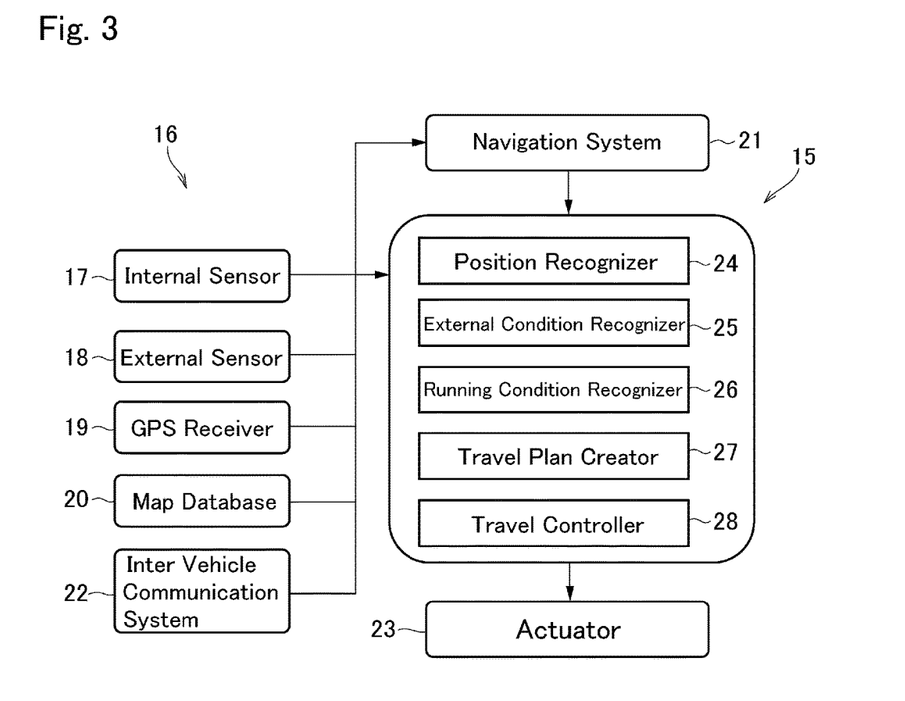
FIG. 3 is a block diagram showing functions of a controller.

In order to integrally control the engine 1, the motor 2, the clutch 8, the transmission 6, the brake devices 14R, 14L and so on, the vehicle Ve is provided with a controller (referred to as "ECU" in FIG. 3) 15 as an electronic control unit composed mainly of a microcomputer. Functions of the controller 15 are shown in FIG. 3, and as shown in FIG. 3, detection signals and information are sent to the controller 15 from auxiliaries 16. Although only one controller is depicted in FIG. 3, a plurality of controllers 15 may be arranged in the vehicle Ve to control the above-mentioned devices individually.

An internal sensor 17 as the auxiliary 16 includes an accelerator sensor for detecting a position of an accelerator pedal, a brake sensor (or switch) for detecting a depression of a brake pedal, a steering sensor for detecting a steering angle of the steering wheel, an engine speed sensor for detecting a speed of the engine 1, an output speed sensor for detecting an output speed of the transmission 6, a vehicle speed sensor for detecting a speed of the vehicle Ve, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, a temperature sensor for detecting a temperature of the catalytic converter 4, and so on.

An external sensor 18 as the auxiliary 16 includes at least one of the following external sensors, such as an on-board camera, a RADAR (i.e., a radio detection and ranging), and a LIDAR (i.e., a laser imaging detection and ranging).

For example, the on-board camera may be arranged inside of a windshield glass, and transmits recorded information about the external condition to the controller 15. To this end, not only a monocular camera but also a stereo camera having a plurality of lenses and image sensors to achieve a binocular vision may be used as the on-board camera. If the stereo camera is used as the on-board camera, the controller 15 is allowed to obtain three-dimensional information of the recorded object.

The RADAR is adapted to detect obstacles utilizing radio waves such as millimetric-waves and microwaves, and to transmit detected information to the controller 15. Specifically, the RADAR detects an obstacle such as other vehicles and so on by emitting radio waves and analyzing the radio waves reflected from the obstacle.

The LIDAR is adapted to detect obstacles utilizing laser light and to transmit detected information to the controller 15. Specifically, the LIDAR detects an obstacle such as other vehicles and so on by emitting laser light and analyzing the laser light reflected from the obstacle.

The vehicle Ve is further provided with a GPS (i.e., global positioning system) receiver 19, a digital map database 20, a navigation system 21, and an inter-vehicle communication system 22. Specifically, the GPS receiver 19 is adapted to obtain a position (i.e., latitude and longitude) of the vehicle Ve based on incident signals from GPS satellites, and to transmit the positional information to the controller 15. The map database 20 may be installed in the controller 15, but map information stored in external online information processing systems may also be available. The navigation system 21 is configured to determine a travelling route of the vehicle Ve based on the positional information obtained by the GPS receiver 19 and the map database 20. The inter-vehicle communication system 22 is configured to receive information about a speed, a stopping time, a turning signal etc. from other vehicle, and to transmit information about a course of the vehicle Ve to other vehicle. Such information may be transmitted between the vehicle Ve and other vehicle not only directly but also indirectly through an external data processing center or the like.

The controller 15 carries out calculations based on the incident data from the auxiliaries 16 and preinstalled data, and calculation results are sent in the form of command signal to actuators 23 of the engine 1, the motor 2, the clutch 8, the transmission 6, the brake devices 14R, 14L and so on. In FIG. 3, only one actuator 23 is illustrated for the sake of illustration.

The actuator 23 includes a throttle actuator, a brake actuator, a steering actuator, a clutch actuator and so on. The throttle actuator is adapted to control an opening degree of the throttle valve of the engine 1 and to control a power supply to the motor 2 based on the command signal transmitted from the controller 15. The brake actuator is adapted to control brake torques applied to the front wheels 3R and 3L by actuating the brake devices 14R and 14L based on the command signal transmitted from the controller 15. The steering actuator is adapted to control steering torque by actuating an assist motor of a power steering mechanism based on the command signal transmitted from the controller 15. The clutch actuator is adapted to control a torque transmitting capacity of the clutch 8 by controlling a contact pressure between the drive plate 9 and the driven plate 10 of the clutch 8 based on the command signal transmitted from the controller 15.

The controller 15 comprises a position recognizer 24, an external condition recognizer 25, a running condition recognizer 26, a travel plan creator 27, a travel controller 28 and so on.

The position recognizer 24 is configured to recognize a current position of the vehicle Ve on a map based on positional information received by the GPS receiver 19 and the map database 20. The current position of the vehicle Ve may also be obtained from the positional information used in the navigation system 21. Optionally, the vehicle Ve may also be adapted to communicate with external sensors and signposts arranged along the road to obtain the current position of the vehicle Ve.

The external condition recognizer 25 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR, and the information transmitted from the inter-vehicle communication system 22. Optionally, weather information, a friction coefficient of road surface etc. may be obtained according to need.

The running condition recognizer 26 is configured to recognize running condition of the vehicle Ve such as a vehicle speed, a longitudinal acceleration, a lateral acceleration, a yaw rate and so on based on detection result of the internal sensors 17.

The travel plan creator 27 is configured to create a travel locus of the vehicle Ve based on a target course determined by the navigation system 21, a position of the vehicle Ve recognized by the position recognizer 24, and an external condition recognized by the external condition recognizer 25. That is, the travel plan creator 27 creates a travel locus of the vehicle Ve within the target course in such a manner that the vehicle Ve is allowed to travel and stop safely and properly while complying with the traffic rules.

In addition, the travel plan creator 27 is further configured to create a travel plan in line with the travel locus and the target course created based on the recognized external conditions and the map database 20.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 27 creates a future plan to change a vehicle speed, acceleration, steering torque etc. during travelling along the target course in the form of e.g., a map.

Alternatively, the travel plan creator 27 may also create a pattern to change the vehicle speed, acceleration, steering torque etc. between predetermined points on the travel locus. Specifically, such patterns may be determined by setting target values of those parameters at each point on the travel locus taking account of a required time to arrive at the point at the current speed.

The travel controller 28 is configured to operate the vehicle Ve autonomously in line with the travel plan created by the travel plan creator 27. To this end, specifically, the travel controller 28 transmits command signals to the throttle actuator, the brake actuator, the steering actuator and so on to operate the vehicle Ve autonomously in accordance with the travel plan.

The control system according to the embodiment is configured to prevent shortage of braking force even if the engine 1 and the motor 2 are operated continuously when temporarily stops the vehicle Ve operated in the autonomous mode.

Figure 4:
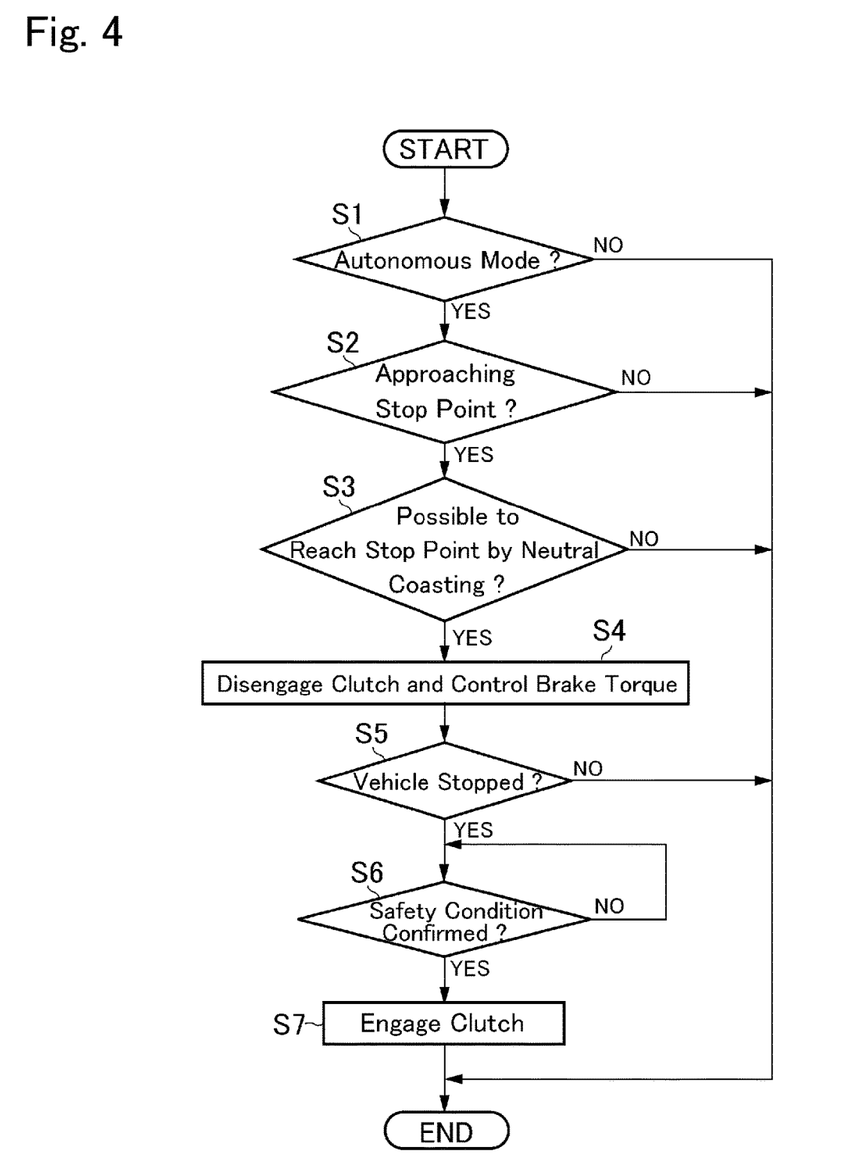
FIG. 4 is a flowchart showing an example of a routine for controlling a clutch and a brake during propulsion in an autonomous mode.

Turning to FIG. 4, there is shown an example of a routine for controlling the clutch 8 and the brake devices 14R and 14L to maintain the braking force when temporarily stops the vehicle Ve during operation in the autonomous mode. At step S1, it is determined whether the vehicle Ve is operated in the autonomous mode based on a flag representing selection of the autonomous mode. If the flag representing selection of the autonomous mode is turned off, that is, if the vehicle Ve is operated in the manual mode so that the answer of step S1 is NO, the routine returns without carrying out any specific control.

By contrast, if the vehicle Ve is operated in the autonomous mode so that the answer of step S1 is YES, the routine progresses to step S2 to determine whether the vehicle Ve approaches to a stop point (e.g., a stop line) at which the vehicle Ve is ordered to stop temporarily to comply with the traffic rules within a predetermined distance, in the travelling route determined by the navigation system 21 or the target course created by the travel plan creator 27. For example, the stop point such as the stop line or a road sign representing the stop point may be detected based on image data collected by the on-board camera or data installed in the navigation system 21. The predetermined distance may be set based e.g., on a shooting distance of the on-board camera.

If the stop point does not exist within the predetermined distance so that the answer of step S2 is NO, the routine returns without carrying out any specific control. By contrast, if the vehicle Ve approaches to the stop point within the predetermined distance so that the answer of step S2 is YES, the routine progresses to step S3 to determine whether the vehicle Ve can arrive at the stop point by coasting the vehicle Ve while disengaging the clutch 8 (i.e., by a neutral coasting). Such determination at step S3 may be made based on a current vehicle speed, a distance from a current location of the vehicle Ve to the stop point, a road gradient, a running resistance and so on.

If the vehicle Ve cannot arrive at the stopping point by the neutral coasting so that the answer of step S3 is NO, the routine returns without carrying out any specific control. In this case, specifically, the vehicle Ve is powered by the engine 1 and/or the motor 2 until the vehicle Ve arrives at the stop point. By contrast, if the vehicle Ve can arrive at the stopping point by the neutral coasting so that the answer of step S3 is YES, the routine progresses to step S4 to disengage the clutch 8 while controlling the brake torques of the brake devices 14R and 14L. At step S4, specifically, a power transmission through the transmission route from the prime mover to the front wheels 3R and 3L is enabled, and the brake torques of the brake devices 14R and 14L are controlled in such a manner that the vehicle Ve will stop at the stop point. In the case that the answer of step S3 is YES, it is not necessary to apply the brake torques of the brake devices 14R and 14L immediately to the front wheels 3R and 3L, and a timing to apply the brake torques of the brake devices 14R and 14L to the front wheels 3R and 3L may be changed depending on a road condition or the like.

Then, it is determined at step S5 whether the vehicle Ve is stopped based on a detection value of the vehicle speed sensor or the like. If the vehicle Ve has not yet been stopped, that is, if the vehicle Ve has not yet arrived at the stop point so that the answer of step S5 is NO, the routine returns without carrying out any specific control. In this case, the disengagement of the clutch 8 is maintained while controlling the brake torques of the brake devices 14R and 14L continuously to stop the vehicle Ve at the stop point.

By contrast, if the vehicle Ve has been stopped so that the answer of step S5 is YES, the routine progresses to step S6 to determine whether the safety condition has been confirmed. At step S6, specifically, it is determined whether the road is sufficiently clear, that is, whether the vehicle can proceed through an intersection without causing an accident with other vehicles or pedestrians, based on the detection results of the on-board camera, the RADAR and the LIDAR. Such safety condition will not be confirmed at step S6 if the vehicle Ve is expected to collide with the other vehicles or pedestrians.

If the safety condition has not yet been confirmed so that the answer of step S6 is NO, the routine returns to step S6 to repeat the safety confirmation until the safety condition has been confirmed. The control of the brake torques of the brake devices 14R and 14L executed from step S4 until the safety condition is confirmed at S6 corresponds to the "braking control" of the embodiment. By contrast, if the safety condition has been confirmed at S6 so that the answer of step S6 is YES, the routine progresses to step S7 to engage the clutch 8, and thereafter returns. Consequently, torque of the engine 1 and the motor 2 are delivered to the front wheels 3R and 3L.

Thus, when the vehicle Ve is stopped temporarily during operation in the autonomous mode, the clutch 8 is disengaged to interrupt torque transmission from the prime mover and the front wheels 3R and 3L. In this situation, therefore, the prime mover may be stopped. In addition, the torque of the prime mover will not be delivered to the front wheels 3R and 3L even if the prime mover is activated. For these reasons, the braking force can be ensured sufficiently even if the brake devices 14R and 14L are aged, irrespective of a road surface condition. In other words, the clutch 8 may serve as a support device for supporting the brake devices 14R and 14L to increase the safety.

In addition, resistances applied to the engine 1 and the motor 2 can be reduced by disengaging the clutch 8 during stopping the vehicle Ve temporarily. For this reason, it is unnecessary to drive the engine 1 and the motor 2 excessively and hence the fuel and the electricity can be saved.

Further, the resistances applied to the engine 1 and the motor 2 may also be reduced by disengaging the clutch 8 to allow the vehicle Ve to coast before stopping at the stop point. For this reason, it is unnecessary to drive the engine 1 and the motor 2 excessively and hence the fuel and the electricity can be saved.

In the routine shown in FIG. 4, steps S3 and S4 may be omitted. In this case, after detecting the stop point at step S2, the vehicle Ve is stopped at the stop point while engaging the clutch 8, and then the clutch 8 is disengaged. That is, the clutch 8 may be disengaged after stopping the vehicle Ve in a case that the engagement of the clutch 8 has to be maintained until the vehicle Ve arrives at the stop point, irrespective of availability of the neutral coasting.

Figure 5:
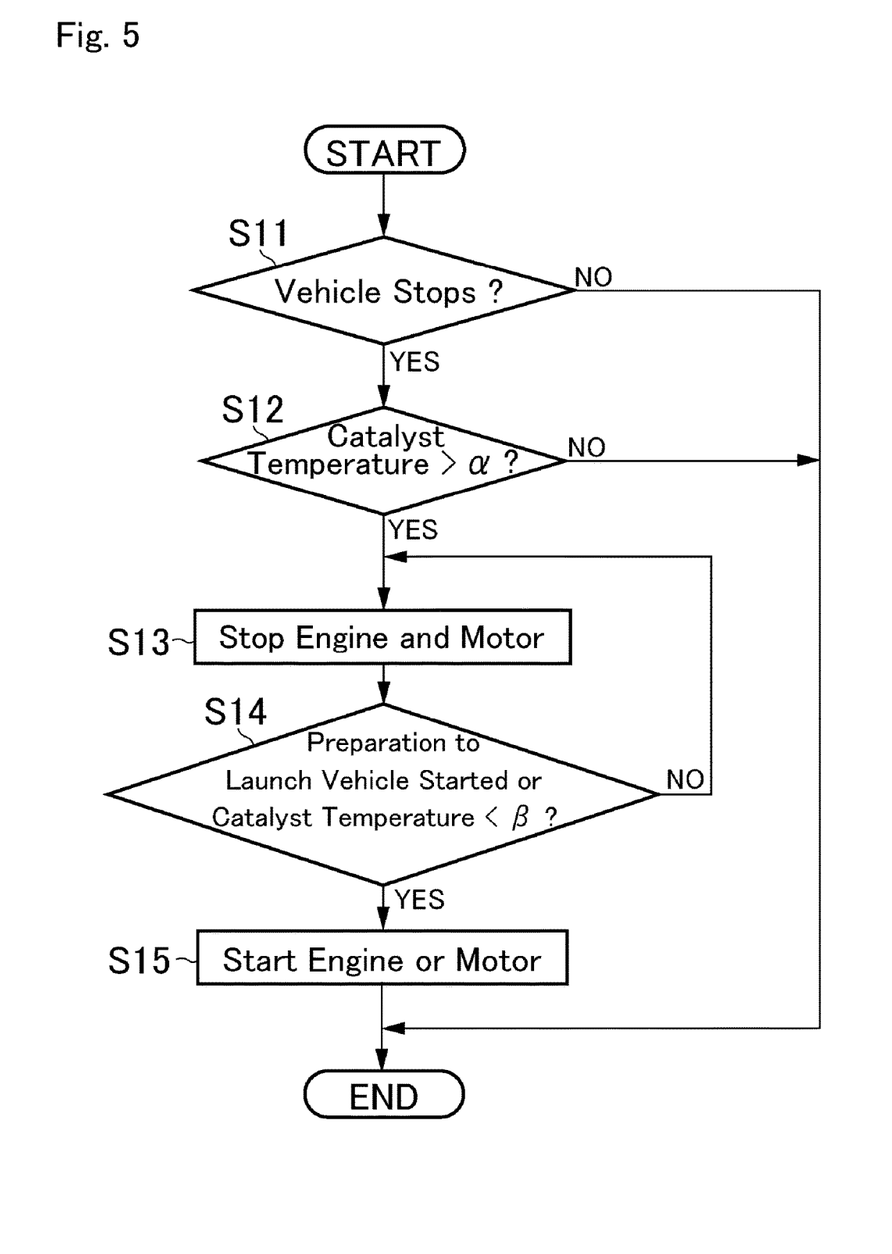
FIG. 5 is a flowchart showing an example of a routine for controlling an engine and a motor during propulsion in the autonomous mode.

Next, a routine for controlling the engine 1 and the motor 2 in the autonomous mode will be explained with reference to FIG. 5. At step S11, it is determined whether the vehicle Ve stops temporarily, in other words, whether the vehicle Ve has arrived at the stop point. Specifically, such temporal stop of the vehicle Ve may be determined based on a fact that a main switch of the vehicle Ve stopping at the stop point is turned on, in other words, the vehicle Ve stopping at the stop point is in the ready-on state.

If the vehicle Ve does not stop temporarily so that the answer of step S11 is NO, the routine returns without carrying out any specific control. By contrast, if the vehicle Ve stops temporarily so that the answer of step S11 is NO, the routine progresses to step S12 to determine whether a temperature of the catalyst is higher than a first reference temperature a based on a detection value of a sensor for detecting a temperature of the catalytic converter 4. Specifically, the first reference temperature a is set to a level at which a purifying performance of the catalytic converter 4 can be maintained higher than an acceptable level even if the engine 1 and the motor 2 are stopped and then the engine 1 is started after a predetermined period of time. The first reference temperature a thus set is stored in the controller 15, and may be varied depending on an external temperature, an oil temperature and so on.

If the temperature of the catalyst is lower than the first reference temperature a so that the answer of step S12 is NO, the routine returns without carrying out any specific control. That is, the engine 1 and the motor 2 are driven continuously to warm the catalytic converter 4. By contrast, if the temperature of the catalyst is higher than the first reference temperature a so that the answer of step S12 is YES, the routine progresses to step S13 to stop the engine 1 and the motor 2. Then, at step S14, it is determined whether a preparation to launch the vehicle Ve has been started, or whether the temperature of the catalyst is lower than a second reference temperature ß.

Commencement of the preparation to launch the vehicle Ve can be determined by the same procedure as step S6 of the routine shown in FIG. 4. Specifically, commencement of the preparation to launch the vehicle Ve can be determined based on a fact that the safety condition has been confirmed. The second reference temperature ß is lower than the first reference temperature a, and set to a level at which the purifying performance of the catalytic converter 4 can be maintained to an allowable limit level.

If the preparation to launch the vehicle Ve has not yet been started and the temperature of the catalyst is higher than the second reference temperature ß so that the answer of step S14 is NO, this means that the engine 1 and the motor 2 are not required to be driven. In this case, therefore, the routine returns to step S13 to keep stopping the engine 1 and the motor 2. By contrast, if the preparation to launch the vehicle Ve has been started or the temperature of the catalyst is lower than the second reference temperature ß so that the answer of step S14 is YES, the routine progresses to step S15 to start the engine 1 or the motor 2 to prevent an excessive temperature drop of the catalytic converter 4. At step S15, for example, the prime mover to be started (that is, the engine 1 or the motor 2) may be chosen based on a state of charge level of the battery or an external condition.

When the temperature of the catalytic converter 4 is high enough, the fuel and the electricity can be saved by stopping the engine 1 and the motor 2. In addition, since an excessive temperature drop of the catalytic converter 4 is prevented, the purifying performance of the catalytic converter 4 will not be reduced when restarting the engine 1 so that the exhaust gas is purified sufficiently.

Figure 6:
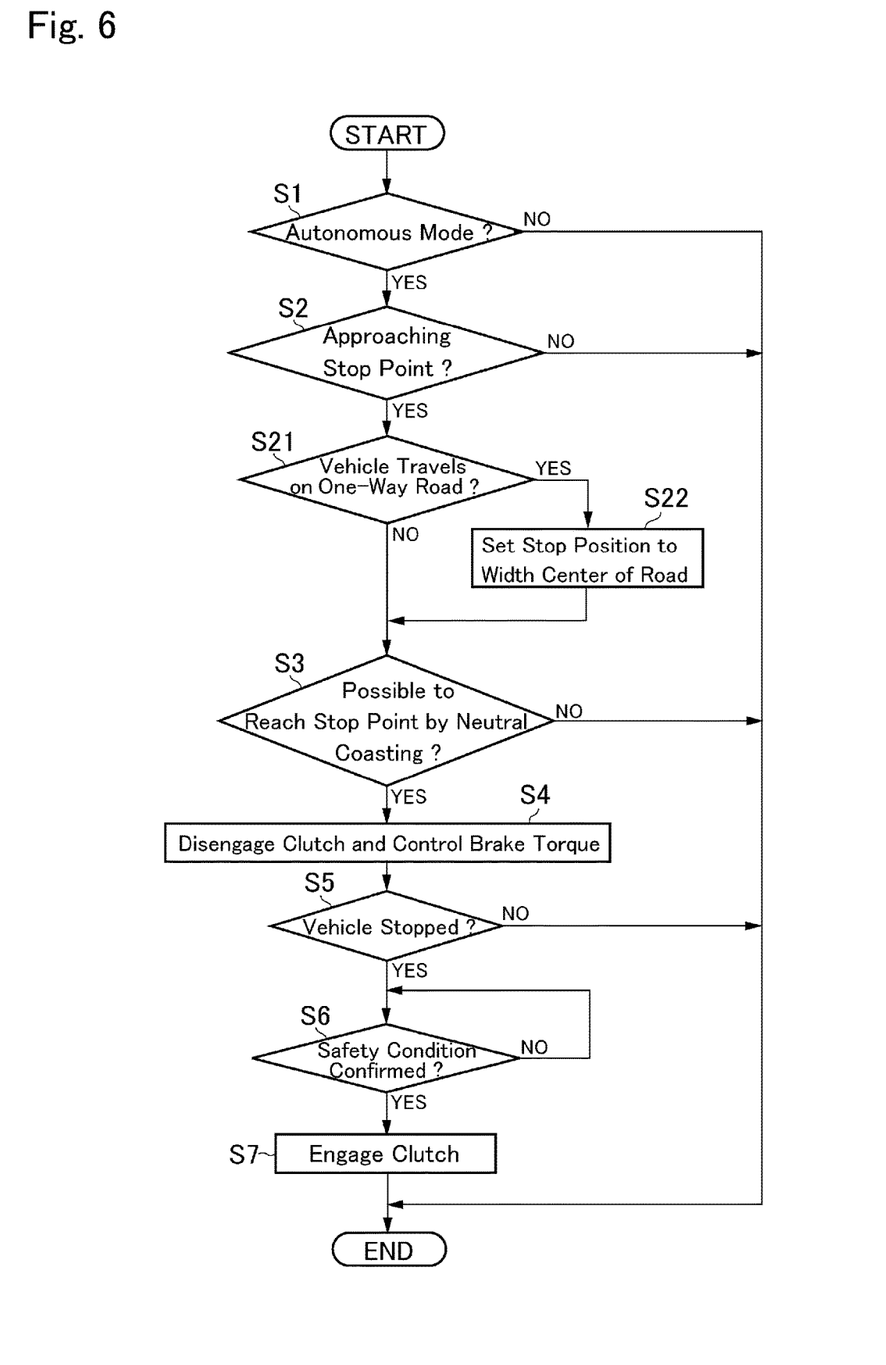
FIG. 6 is a flowchart showing an example of a routine for determining an order to enter the intersection.

Turning to FIG. 6, there is shown a routine for adjusting the stop point depending on the travelling route. In FIG. 6, common step numbers are allotted to the steps in common with those in the routine shown in FIG. 4. In the routine shown in FIG. 6, if the vehicle Ve approaches to the stop point within the predetermined distance so that the answer of step S2 is YES, the routine progresses to step S21 to determine whether the vehicle Ve travels on a one-way road. Such determination at step S21 may be made based on the current position of the vehicle Ve detected by the position recognizer 24 of the navigation system 21 and the map database 20.

If the vehicle Ve does not travel on a one-way road so that the answer of step S21 is NO, the routine progresses to step S3. By contrast, if the vehicle Ve travels on a one-way road so that the answer of step S21 is YES, the routine progresses to step S22 to set a stop position of the vehicle Ve in the stop point at a width center of a road or a lane by the travel plan creator 27, and further progresses to step S3. To this end, a width of the road or lane may be detected by the on-board camera or based on the data stored in the navigation system 21. If a shoulder is formed along the road, the stop position is set to the center of the road excluding the shoulder.

By thus stopping the vehicle Ve at the width center of the road or lane, a space to allow pedestrian and bicycles to pass beside the vehicle Ve can be maintained.

Figure 7:
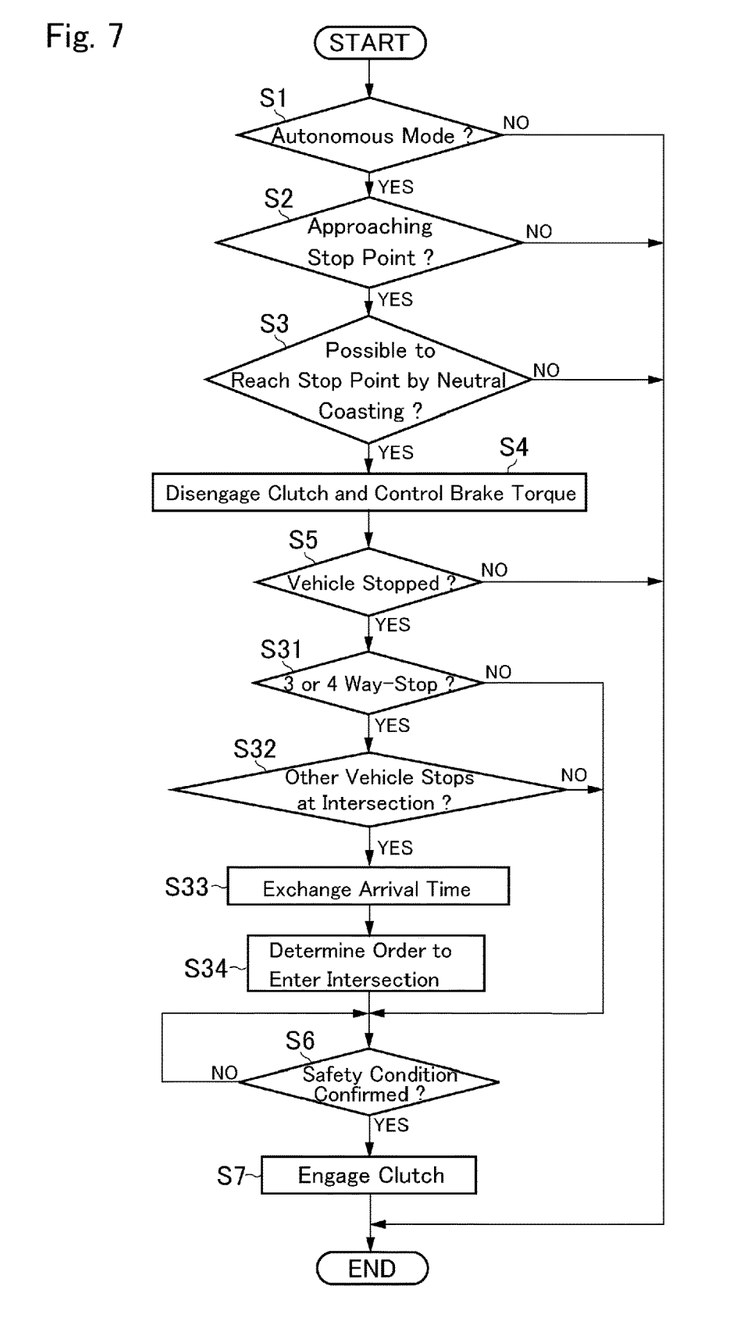
FIG. 7 is a flowchart showing an example of a routine for determining an order to enter an all-way stop.

Turning to FIG. 7, there is shown a routine for determining a priority order of the vehicle Ve to proceed through an all-way stop intersection by exchanging information with other vehicles. In FIG. 7, common step numbers are allotted to the steps in common with those in the foregoing routines. In the routine shown in FIG. 7, if the vehicle Ve has been stopped so that the answer of step S5 is YES, the routine progresses to step S31 to determine whether the intersection is an all-way stop (e.g., a three-way stop and a four-way stop). Such determination at step S31 may also be made based on the current position of the vehicle Ve detected by the position recognizer 24 of the navigation system 21 and the map database 20.

If the intersection is not an all-way stop so that the answer of step S31 is NO, the routine progresses directly to step S6. By contrast, if the intersection is an all-way stop so that the answer of step S31 is YES, the routine progresses to step S32 to determine whether other vehicle(s) from other approach(es) stop(s) at the intersection based on the recorded information of the on-board camera, or detection data of the RADAR or the LIDAR.

If no other vehicles stops at the intersection so that the answer of step S32 is NO, the routine progresses directly to step S6. By contrast, if at least one other vehicle stops at the other approach(es) of the intersection so that the answer of step S32 is YES, the routine progresses to step S33 to exchange information with the other vehicle(s) to determine a priority order to proceed through the intersection. Specifically, information about arrival times at the intersection are exchanged between the vehicle Ve and the other vehicle(s) through the inter-vehicle communication system 22 and the external data processing center or the like. Instead, the priority order to proceed through the intersection may also be determined by specifying the first vehicle arrived at the intersection by other means.

Then, the priority order of the vehicle to proceed through the intersection is determined at step S34 based e.g., on the information about arrival times, and the routine progresses to step S6. That is, the first vehicle is endowed with a priority to proceed through the intersection. Such information about the priority order is shared with the vehicle Ve and the other vehicles arrive at the intersection. In this case, the safety condition to be confirmed at step S6 includes the priority order to enter the intersection.

Thus, according to the embodiment, the vehicle Ve is allowed to proceed through the all-way stop safely while complying with the traffic rules.

The routine shown in FIG. 7 may also be applied to determine a priority order to enter the intersection between the vehicle Ve turning to the right or left across an oncoming lane and the other vehicle travelling straight ahead on the oncoming lane. In this case, the other vehicle travelling straight ahead on the oncoming lane is endowed with a priority to proceed through the intersection.

Figure 8:
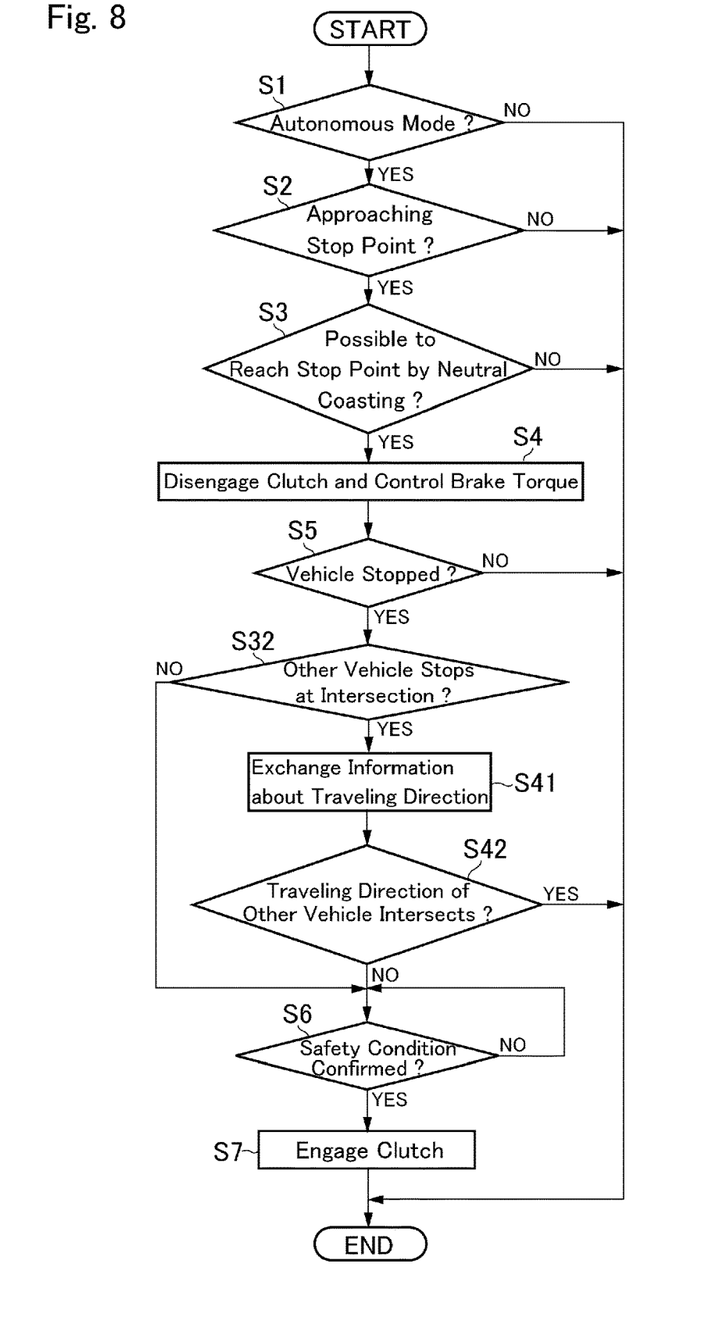
FIG. 8 is a flowchart showing an example of a routine for allowing the vehicle to enter the intersection depending on a travelling direction of other vehicle stopping at other approach of the intersection.

However, if all of the vehicles arrived at the intersection make turn in the same direction, e.g., turn to left, all of the vehicles are allowed to proceed through the intersection without interference. In this case, it is preferable to allow the vehicle Ve to enter the intersection irrespective of the arrival time. Turning to FIG. 8, there is shown a routine for allowing the vehicle Ve to enter the intersection depending on a travelling direction(s) of the other vehicle(s). In FIG. 8, common step numbers are allotted to the steps in common with those in the foregoing routines.

In the routine shown in FIG. 8, if the vehicle Ve has been stopped so that the answer of step S5 is YES, the routine progresses to step S32 to determine whether the other vehicle(s) from other approach(es) stop(s) at the intersection. Such determination at step S32 is similar to step S32 in the routine shown in FIG. 7, but the determination about the all-way stop is omitted.

If no other vehicles stops at the intersection so that the answer of step S32 is NO, the routine progresses directly to step S6. By contrast, if at least one other vehicle stops at the other approach(es) of the intersection so that the answer of step S32 is YES, the routine progresses to step S41 to exchange information about travelling directions with the other vehicle(s). Such information about travelling directions may also be exchanged between the vehicle Ve and the other vehicle(s) through the inter-vehicle communication system 22 and the external data processing center or the like. Instead, the travelling direction of the vehicles may also be obtained from direction indicator lamps.

Then, it is determined at step S42 whether the travelling direction of any of the other vehicles intersect(s) with the planned travelling direction of the vehicle Ve based on the information exchanged at step S41. If the travelling direction of any of the other vehicles is/are expected to intersect with the planned travelling direction of the vehicle Ve so that the answer of step S42 is YES, the routine returns without carrying out any specific control. By contrast, if the travelling direction of the other vehicle(s) is/are not expected to intersect with the planned travelling direction of the vehicle Ve so that the answer of step S42 is NO, the routine progresses to step S6. In this case, the vehicle Ve is allowed to enter the intersection without waiting the other vehicle(s) to proceed through the intersection.

By thus allowing the vehicle Ve to enter the intersection without waiting the other vehicle(s) when all of the vehicles arrived at the intersection make turn in the same direction, it is possible to ease a congestion at the intersection.

The vehicle control system according to the embodiment may also be applied to a vehicle in which only an engine serves as a prime mover, and an electric vehicle in which only a motor serves as a prime mover.

Although the above exemplary embodiments of the present application have been described, it will be understood by those skilled in the art that the present application should not be limited to the described exemplary embodiments, and various changes and modifications can be made within the scope of the present disclosure. For example, given that a geared transmission is used as the transmission 6, the torque transmission between the prime mover and the drive wheels may be interrupted by disengaging a clutch used in the geared transmission, and hence the clutch 8 may be omitted. Further, given that a differential mechanism is arranged between the prime mover and the drive wheels, the torque transmission between the prime mover and the drive wheels may be interrupted by reducing a reaction force of the differential mechanism. Furthermore, the foregoing routines may be executed not only simultaneously, but also be executed in arbitrary combination with one another.

What is claimed is:
1. A vehicle control system, comprising:
a prime mover;
a drive wheel to which a torque is delivered from the prime mover to generate a driving force;

a brake device that applies a brake torque to at least any one of wheels including the drive wheel;

an interrupting device that is disposed on a torque transmission route between the prime mover and the drive wheel to allow torque transmission through the torque transmission route when engaged, and to interrupt torque transmission through the torque transmission route when disengaged; and a controller that operates a vehicle autonomously without requiring a driver to launch, stop, and turn the vehicle manually by controlling at least the prime mover, the brake device, and the interrupting device, wherein the controller is configured to:

detect a stop point at which the vehicle is ordered to stop temporarily, execute a braking control to stop the vehicle at the stop point when the stop point is detected, disengage the interrupting device while stopping the vehicle temporarily, confirm a safety condition based on surrounding information of the vehicle and an external condition when launching the vehicle from the temporary stop point, while keeping the vehicle stopped and, while keeping disengagement of the interrupting device, and engage the interrupting device after confirming the safety condition.

2. The vehicle control system as claimed in claim 1, wherein the prime mover includes an engine, the vehicle control system further comprises a catalytic converter, the controller is further configured to detect a temperature of the catalytic converter while stopping the vehicle temporarily at the stop point, and stop the engine when the temperature of the catalytic converter is higher than a first reference temperature.

3. The vehicle control system as claimed in claim 2, wherein the controller is further configured to restart the engine while stopping the vehicle temporarily at the stop point, when the temperature of the catalytic converter is higher than a second reference temperature that is lower than the first reference temperature.

4. The vehicle control system as claimed in claim 1, wherein the prime mover includes an engine and a motor, the vehicle control system further comprises a catalytic converter, the catalytic converter is warmed by a heat generated by the motor, the controller is further configured to detect a temperature of the catalytic converter while stopping the vehicle temporarily at the stop point, and stop the engine and the motor when the temperature of the catalytic converter is higher than a first reference temperature.

5. The vehicle control system as claimed in claim 4, wherein the controller is further configured to restart any one of the engine and the motor while stopping the vehicle temporarily at the stop point, when the temperature of the catalytic converter is higher than a second reference temperature that is lower than the first reference temperature.

6. The vehicle control system as claimed in claim 1, wherein the controller is further configured to stop the vehicle at a width center of a road when stopping the vehicle at the stop point in a one-way road.

7. The vehicle control system as claimed in claim 1, wherein the controller is further configured to determine whether other vehicle from other approach stops at an intersection, exchange information with the other vehicle for determining a priority order to enter the intersection, and determine the priority order to enter the intersection based on the exchanged information.

8. The vehicle control system as claimed in claim 7, wherein the information includes an arrival time at the intersection.

9. The vehicle control system as claimed in claim 1, wherein the controller is further configured to determine whether other vehicle from other approach stops at an intersection, exchange information about a travelling direction with the other vehicle, and allow the vehicle to enter the intersection irrespective of entrance of the other vehicle when the travelling direction of the vehicle do not intersect with the travelling direction of the other vehicle.

10. A vehicle control system, comprising:

a prime mover;

a drive wheel to which a torque is delivered from the prime mover to generate a driving force;

a brake device that applies a brake torque to at least any one of wheels including the drive wheel;

an interrupting device that is disposed on a torque transmission route between the prime mover and the drive wheel to allow torque transmission through the torque transmission route when engaged, and to interrupt torque transmission through the torque transmission route when disengaged; and a controller that operates a vehicle autonomously without requiring a driver to launch, stop, and turn the vehicle manually by controlling at least the prime mover, the brake device, and the interrupting device, wherein the controller is configured to:

detect a stop point at which the vehicle is ordered to stop temporarily, determine whether the vehicle can arrive at the stop point by coasting the vehicle while disengaging the interrupting device, disengage interrupting device before the vehicle arrives at the stop point while executing a braking control to stop the vehicle temporarily at the stop point, when the vehicle can arrive at the stop point by coasting the vehicle while disengaging the interrupting device, confirm a safety condition based on surrounding information of the vehicle and an external condition when launching the vehicle from the temporary stop point, while keeping the vehicle stopped and, while keeping disengagement of the interrupting device, and engage the interrupting device after confirming the safety condition.

11. The vehicle control system as claimed in claim 10, wherein the prime mover includes an engine, the vehicle control system further comprises a catalytic converter, the controller is further configured to detect a temperature of the catalytic converter while stopping the vehicle temporarily at the stop point, and stop the engine when the temperature of the catalytic converter is higher than a first reference temperature.

12. The vehicle control system as claimed in claim 11, wherein the controller is further configured to restart the engine while stopping the vehicle temporarily at the stop point, when the temperature of the catalytic converter is higher than a second reference temperature that is lower than the first reference temperature.

13. The vehicle control system as claimed in claim 10, wherein the prime mover includes an engine and a motor, vehicle control system further comprises a catalytic converter, the catalytic converter is warmed by a heat generated by the motor, the controller is further configured to detect a temperature of the catalytic converter while stopping the vehicle temporarily at the stop point, and stop the engine and the motor when the temperature of the catalytic converter is higher than a first reference temperature.

14. The vehicle control system as claimed in claim 13, wherein the controller is further configured to restart any one of the engine and the motor while stopping the vehicle temporarily at the stop point, when the temperature of the catalytic converter is higher than a second reference temperature that is lower than the first reference temperature.

15. The vehicle control system as claimed in claim 10, wherein the controller is further configured to stop the vehicle at a width center of a road when stopping the vehicle at the stop point in a one-way road.

16. The vehicle control system as claimed in claim 10, wherein the controller is further configured to determine whether other vehicle from other approach stops at an intersection, exchange information with the other vehicle for determining a priority order to enter the intersection, and determine the priority order to enter the intersection based on the exchanged information.

17. The vehicle control system as claimed in claim 16, wherein the information includes an arrival time at the intersection.

18. The vehicle control system as claimed in claim 10, wherein the controller is further configured to:

determine whether other vehicle from other approach stops at an intersection, exchange information about a travelling direction with the other vehicle, and allow the vehicle to enter the intersection irrespective of entrance of the other vehicle when the travelling direction of the vehicle do not intersect with the travelling direction of the other vehicle.

* * * * *